US012397881B2

(12) United States Patent
Meason et al.

(10) Patent No.: US 12,397,881 B2
(45) Date of Patent: Aug. 26, 2025

(54) MOORING LINE CONNECTOR APPARATUS AND METHOD

(71) Applicant: ORBITAL MARINE POWER LIMITED, Kirkwall Orkney (GB)

(72) Inventors: Jonathan Meason, Hagersten (SE); Calum Miller, Kirkwall Orkney (GB); William Annal, Kirkwall Orkney (GB)

(73) Assignee: ORBITAL MARINE POWER LIMITED, Kirkwall Orkney (GB)

( * ) Notice: Subject to any disclaimer, the term of this patent is extended or adjusted under 35 U.S.C. 154(b) by 603 days.

(21) Appl. No.: 17/780,145

(22) PCT Filed: Nov. 24, 2020

(86) PCT No.: PCT/GB2020/052989
§ 371 (c)(1),
(2) Date: May 26, 2022

(87) PCT Pub. No.: WO2021/105662
PCT Pub. Date: Jun. 3, 2021

(65) Prior Publication Data
US 2023/0002011 A1    Jan. 5, 2023

(30) Foreign Application Priority Data
Nov. 28, 2019  (GB) ..................... 1917368

(51) Int. Cl.
*B63B 21/20* (2006.01)
*B63B 21/50* (2006.01)
(52) U.S. Cl.
CPC .............. *B63B 21/20* (2013.01); *B63B 21/50* (2013.01); *B63B 2021/203* (2013.01); *B63B 2021/505* (2013.01)

(58) Field of Classification Search
CPC ... B63B 21/20; B63B 21/50; B63B 2021/203; B63B 2021/505; Y02E 10/30
See application file for complete search history.

(56) References Cited

U.S. PATENT DOCUMENTS

| 5,044,297 A | 9/1991 | De et al. |
| 5,356,321 A | 10/1994 | Boatman et al. |

(Continued)

FOREIGN PATENT DOCUMENTS

| EP | 2154059 A1 | 2/2010 |
| EP | 2313306 A2 | 4/2011 |
| FR | 2984272 A1 | 6/2013 |

(Continued)

OTHER PUBLICATIONS

Combined Search and Examination Report for GB application No. GB1917368.1, dated May 15, 2020.

(Continued)

*Primary Examiner* — Anthony D Wiest
(74) *Attorney, Agent, or Firm* — MOSER TABOADA

(57) ABSTRACT

Disclosed is a connector apparatus for connecting a mooring line to a floating vessel, in which connector assemblies are cooperatively engaged and rotationally constrained. A pre-tensioning arrangement may be provided to apply a pre-tensioning force between the connector assemblies, and pivotable connection may be provided by way of pins which rotationally constrain the assemblies to one another. Methods of connecting and pre-tensioning connector assemblies are also disclosed.

20 Claims, 8 Drawing Sheets

(56) References Cited

U.S. PATENT DOCUMENTS

2007/0155259 A1    7/2007  Van Tol et al.
2016/0280333 A1    9/2016  Trouve

FOREIGN PATENT DOCUMENTS

| | | |
|---|---|---|
| GB | 2500904 A | 10/2013 |
| GB | 2547015 A | 8/2017 |
| WO | WO 96/30253 A1 | 10/1996 |
| WO | WO-2006037964 A1 | 4/2006 |
| WO | WO 2010085156 A1 | 7/2010 |
| WO | WO-2016180866 A1 | 11/2016 |

OTHER PUBLICATIONS

International Search Report and Written Opinion for application No. PCT/GB2020/052989, dated May 14, 2021.
EPO Examination Search Report for Application No. 20 819 825.9 dated Jul. 31, 2024.

MOORING LINE CONNECTOR APPARATUS AND METHOD

FIELD OF THE INVENTION

The invention relates to an apparatus and method for connecting a mooring line to a floating structure, such as a floating renewable energy generating apparatus, in particular a tidal turbine or other water current power generating apparatus.

BACKGROUND TO THE INVENTION

In offshore renewable energy industries, there is increasing focus on the use of semi-permanent floating structures, in preference over those anchored directly to the sea bed. Floating structures can be more quickly and cost effectively deployed, and can be readily towed to shore for decommissioning or repair or relocated to another tidal, wind resource.

Floating structure need to be moored to the sea bed by mooring lines (typically chains, wires or the like). Typically, there is also a requirement to connect additional lines, such as electrical distribution cables, to the floating structure.

WO 2009/141617 (Scotrenewables Marine Power Limited) describes a mooring connector with a "moon pool" (i.e. a bore extending through the deck and hull of the vessel), into which a buoyant frustoconical connector can be cooperatively received. The connector is latched into position around an annular channel on its outer surface, which enables rotation of the connector in relation to the vessel. This arrangement is of particular benefit in the context of floating tidal turbines which must be rotated end-to-end with each cycle of the tides.

Where the turbine apparatus need not be rotated in this way, for example in use in a constantly flowing body of water such as a river or estuary, or where the turbine blades themselves can rotate in order to obviate the requirement to rotate the entire vessel, a rotatable connector such as described in WO 2009/141617 is not required.

So-called "turret" systems are known for use in the oil and gas industry, which take the form of tubular housings extending through the vessel hull to the deck. However conventional systems are not optimised for the particular requirements of floating water current power generation, or the particular stresses transferred via to the mooring connectors of such apparatus by the flowing water acting on turbine blades.

WO 2016/180866 (Single Buoy Moorings Inc.) describes a mooring like connector which has a rotatable guiding body around a central connector body. The connector body is pulled into a tubular housing and locked in place by a complex set of internal end external guide formations and pins, forming part of the guiding body and tubular housing. The connector is specifically adapted to minimise torque, by the provision both of a universal joint at the base of the connector body, and rotational independence between the guide formations and the connector body. Any axial play in the system is prevented only by the weight of the connector and mooring lines. Moreover, the concentric arrangement of guide formations, bearings and connector body takes up the substantial portion of the diameter of the housing.

GB 2500904 (Sigma Offshore Limited) describes a similar mooring line connector, in which a male component is pulled into a tubular female component and latched into place by an array of hydraulic latch elements. Relative axial motion is restricted by the latches, but in order to provide a fail-safe, the latch elements are biased away from abutment with the male connector.

Prior art systems of this type are not optimised for use in the field of tidal power generating apparatus, or similar applications in which comparatively extreme forces are applied between the moorings and the vessel during normal operation.

SUMMARY OF THE INVENTION

According to a first aspect of the invention there is provided a pre-tensionable connector apparatus, comprising:
a first connector assembly;
a second connector assembly for connection to the first connector assembly;
a pre-tensioning arrangement positioned in fixed relation to the second connector assembly, for applying a pre-tensioning force between the first and second connector assemblies; wherein the pre-tensioning arrangement is reconfigurable between a first configuration and a second configuration;
a pull line extending from the first connector assembly and adapted to be coupled to the pre-tensioning arrangement by coupling apparatus; and
coupling apparatus for coupling the pull line to the pre-tensioning arrangement;
wherein, when the first and second connector assemblies are engaged or proximal to one another, a portion of the pull line is positionable in relation to the pre-tensioning arrangement such that the pull line may be coupled thereto by the coupling apparatus; and
wherein, when the pre-tensioning arrangement is coupled to the pull line by the coupling apparatus, and the pre-tensioning arrangement is in the second configuration the said-pre tensioning force is applied by the pre-tensioning arrangement between the first and second connector assemblies.

In use to connect the first and second connector assemblies, once the first connector assembly is engaged with the second connector assembly (or at least proximal thereto), a portion of the pull line is coupled to the pre-tensioning arrangement, typically with the pull line taut, and the pre-tensioning arrangement reconfigured such that the pre-tensioning force is applied.

The pre-tensioning apparatus provides for efficient connection between the first and second connector assemblies, by pulling the pull line, and the application of a pre-tensioning force to retain the connection. The pre-tensioning force is a residual force applied between the connector assemblies via the pull line to retain them in connection with one another. The pre-tensioning force prevents movement between the first and second connector assemblies, in use. For example, the first connector assembly may be connected in use to a mooring line, or other apparatus prone to applying forces to the first connector assembly which act to disengage the first connector assembly from the second connector assembly, or cause movement therebetween. Any such relative movement, which might otherwise cause damage or wear to the connector assembly or the structures associated therewith (e.g. a floating vessel) may be reduced or eliminated by applying a pre-tensioning force between the first and second connector assemblies. The pre-tensioning force and any additional loads applied to the first connector assembly are also distributed via the pull line to the pre-tensioning arrangement. The structural requirements for receiving such forces can be located away from the connector assemblies themselves. This design flexibility may be of particular benefit in floating applications, to avoid engineering compromises for example in hull design.

The pre-tensioning force may be applied by reconfiguring the pre-tensioning arrangement from the first configuration to the second configuration. In some embodiments, a first force between the first and second connector assemblies is applied to the pull line equal to or in excess of the pre-tensioning force, the pre-tensioning arrangement reconfigured from the first to the second configuration and the first force released, such that the pre-tensioning force between the first and second connector assemblies is maintained by the pre-tensioning arrangement, in the second configuration thereof.

The connector apparatus may be configured for the coupling apparatus to be connected to the pre-tensioning arrangement when the pre-tensioning arrangement is in the first configuration and wherein, when the pre-tensioning arrangement is coupled to the pull line by the coupling apparatus, reconfiguring the pre-tensioning arrangement from the first configuration to the second configuration applies the said-pre tensioning force.

By reconfiguring, herein we refer to at least moving one or more parts of the pre-tensioning arrangement. Reconfiguring may include adding one or more components to the pre-tensioning arrangement, such as a retainer or spacer as discussed below.

The pre-tensioning arrangement may be extended from the first configuration to the second configuration, in some embodiments to apply the pre-tensioning force. The pre-tensioning arrangement may be contracted or otherwise reconfigured, in some embodiments in order to apply the pre-tensioning force.

The pull line may comprise a coupling portion. A coupling portion may for example comprise an aperture or other latching formation therein.

The coupling apparatus may be adapted to engage with the coupling portion. The coupling apparatus may for example comprise extendable latches, a clamp, or the like.

Any suitable latching arrangements may be used, such as one or more collars, plates or pin adapted to be received in a recess, channel, lip or other suitable formation on the coupling portion.

The coupling apparatus may comprise a latch pin; and the coupling portion may comprise a latch pin aperture extending from a first side to a second side thereof and sized to receive the latch pin.

The pre-tensioning arrangement may engage with the latch pin on the first and second sides of the coupling portion of the pull line.

The pull line coupling portion may be a part of the pull line, such as a chain link, or a terminal chain link wherein the pull line is a chain.

The pull line may extend to and terminate at the coupling portion.

The coupling portion may be a separate component. Accordingly, the it may be sized independently of the pull line, and thus any suitable dimensions for the latching apparatus may selected. For example, the width between the first and second sides, and any suitable diameter of latch pin and latch pin aperture, may be selected independently of the dimensions of the pull-line.

In use the pre-tensioning force will be transmitted to the latch pin and distributed across the portions of the latch pin which engage with the pre-tensioning arrangement. The latch pin and connector portion may therefore be dimensioned so as to distribute these forces more widely than has previously been possible.

For example, conventional pre-tensioning or latching is achieved by introducing a pin through a chain link, or a loop in a pull line. In such arrangements, the forces are typically applied via an interface between two generally rounded bodies and so stresses are relatively focused. Moreover, the dimensions of the latch pin may be limited by the size of the chain links.

The latch pin aperture may be generally tubular. A tubular aperture may transmit the pre-tensioning force along a length of the latch pin, in use.

The latch pin may fit closely within the latch pin aperture. The pre-tensioning forced may thereby be distributed over as large a surface area of the latch pin as possible. For example, the internal diameter of the aperture may similar to the external diameter of the latch pin, to provide a close, or interference fit therebetween.

Where the latching apparatus comprises a latch pin, the pre-tensioning arrangement may be configured to engage along all or substantially all of the length of the latch pin extending from the latch pin aperture, in use, so as to distribute the transmitted pre-tensioning forces.

The pre-tensioning arrangement may comprise first and second jacking plates, moveable in relation to the second connector assembly to engage with the respective ends of the latch pin extending from the latch pin aperture to the first and second sides of the coupling portion.

The jacking plates may, in use, be positioned adjacent to the coupling portion of the pull line. The skilled person will understand that a gap between the jacking plates and the coupling portion may be desirable to facilitate pulling of the pull line (e.g. via a temporarily attached pilot line), but are desirably as close as possible so as to minimise the unsupported length of latch pin.

The first and second jacking plates may form part of a jacking plate collar, sized to extend around and to at least the first and second sides of the coupling portion. The jacking plate collar may include a port sized to extend entirely around the coupling portion, or may be open-sided (e.g. defining a U-shaped portion for receiving the coupling portion).

The first and second jacking plates may be provided with receiving formations, such as recesses, to engage with the ends of the latch pin.

The pre-tensionable connector apparatus may comprise first and second support plates, in fixed relation to the second connector assembly, the first and second support plates corresponding to the first and second jacking plates, wherein the pre-tensioning arrangement is configured to apply a the pre-tensioning force between the support plates and the jacking plates.

The first and second support plates may form part of a support plate collar, sized to extend around and to at least the first and second sides of the coupling portion. The support plate collar may include a port sized to extend entirely around the pull line or coupling portion thereof, or may be open-sided (e.g. defining a U-shaped portion for receiving the pull line or coupling portion).

The pre-tensioning force may be applied by any suitable means, including by hydraulic actuator(s), mechanically or electromechanically. For example, the pre-tensioning arrangement may include one or more hydraulic rams disposed between the support and jacking plates, operable to extend and move the jacking plates into engagement with the latch pin in use. Torqueing nuts and/or tensioning bolts may be used to reconfigure (either by pushing or pulling) the pre-tensioning arrangement. The pre-tensioning arrangement may be reconfigured by levering, for example by rotating a cam.

When connecting the first and second connector assemblies, a tensioning force may be applied by a winch, such that the pre-tensioning arrangement may be coupled to the pull line terminator, the winch released and the pre-tensioning force thereafter applied by the pre-tensioning arrangement.

The pre-tensioning arrangement may be configured to be locked in place in the second configuration, to maintain the pre-tensioning force. Stated differently, the pre-tensioning arrangement may be passively retained in the second configuration.

The term "passively retained" herein refers to the pre-tensioning arrangement being retained or locked in the second configuration without a hydraulic, electrical or any other type of mechanism requiring to be energised in order to maintain the pre-tensioning force. A passively retained pre-tensioning arrangement, may more reliably maintain the pre-tensioning force over a prolonged period (months or years), as might be required for example for semi-permanently moored vessels such as tidal generators, oil rigs and the like.

Passively maintaining, or locking, the pre-tensioning arrangement in the second configuration may also provide safety benefits, by avoiding risks otherwise associated with mechanical failure of energised apparatus for applying the pre-tensioning force.

A pre-tensioning arrangement may be passively retained for example by way or torqueing or tensioning nuts. Star washers or other retainers (e.g. a retainer applied to the head of the a retaining bolt) may be used to retain the tensioning nuts in the position, when the second configuration has been reached. A rotating cam may also be maintained or locked in position in an analogous manner.

A pre-tensioning arrangement may be passively retained by latching or introducing wedges, spacers, plates other members between components of the pre-tensioning arrangement, to block movement from the second to the first configuration. For example, the jacking plates as disclosed below may be lifted by means of a hydraulic or electromechanical actuator or the like, and one or more spacers introduced between the jacking plates and the support plates to passively retain the pre-tensioning arrangement in the second configuration, such that the actuator(s) need not remain energised.

The connector apparatus may comprise a spacer structure extending between the second connector assembly and the pre-tensioning arrangement. The spacer structure may extend for example between the second connector assembly and the support plates, and at least in part maintain the second connector assembly and support places in their fixed relation to one another.

The pre-tensioning arrangement and second connector assembly may be retained in fixed relation to the spacer structure. The pre-tensioning arrangement may be attached to, or fixed proximal to, one end of the spacer structure, and the second connector assembly may be attached to, or fixed proximal to, the other end of the spacer structure.

The spacer structure may further provide a pathway for pulling the pull line, in order to bring the first and second connector assemblies into engagement with one another.

The spacer structure may be a generally tubular structure, such as a moon pool through the hull of a floating vessel, as disclosed herein.

The support plate(s) may be attached to, or proximal to, an end of the tubular structure.

The pre-tensioning arrangement (e.g. support plate(s) thereof) may be attached to, or fixed proximal to, an upper end of the tubular structure or moon pool.

The pre-tensionable connection apparatus may be for use in securing a mooring line to a floating vessel.

The pull line may be flexible. For example, the pull line may comprise a length of cable, chain or the like. A flexible pull line assists in puling the first and second connector assemblies together from a range of respective alignments: For example, where one or both of the first and second connector assemblies may be prone to move during connection, such as when connecting a mooring line to a floating vessel.

The first connector assembly may be a male connector assembly. The second connector assembly may be a female connector assembly.

The first and second connector assemblies may be adapted to be brought together from a range or respective alignments. For example, one or both may be tapered, as disclosed herein.

The first and second connector assemblies may be male and female connector assemblies as disclosed herein in relation to the second aspect.

The connector apparatus may further comprise a shield or cover, for enclosing the pre-tensioning arrangement and coupling portion of the pull line. The shield or cover may be removable or retractable, so that the upper end of the coupling apparatus can be covered once the coupling apparatus has been pre-tensioned.

The connector apparatus may be configured for one or more further lines, such as hydraulic lines, electrical distribution lines or the like, to be connected, and to pass the male and/or female connector assemblies. For example, the male connector assembly may comprise one or more further connectors, or channels.

According to a second aspect of the invention there is provided a connector apparatus for connecting a mooring line to a floating vessel, the connector apparatus comprising a first, male connector assembly and a second, female connector assembly:

the male connector assembly having a male longitudinal axis; an upper end portion for connection to a pull line; and a lower end portion for connection to a mooring line; a first pin portion extending from the male connector assembly normal to a male longitudinal axis; and a second pin portion extending from an opposite side of the male connector assembly normal to the male longitudinal axis;

the female connector assembly having a connector collar defining a female longitudinal axis and configured to cooperatively engage around an intermediate portion of the male connector assembly;

the female connector assembly comprising a first pin receptor spaced from the female longitudinal axis on a first side of the female connector assembly and a second pin receptor spaced apart from the female longitudinal axis on an opposite second side of the female connector assembly;

wherein, the male assembly is couplable to the female connector assembly and, when the male connector assembly is coupled to the female assembly, the collar cooperatively engages around the intermediate portion of the male connector assembly, the first and second pin portion engage with the respective first and second pin receptors.

In use the male connector assembly is received in the female connector assembly, and the connector collar engages with the male connector assembly to limit longitudinal motion of the male connector assembly in relation to the female connector assembly. The first and second pins are respectively received by the first and second pin receptors, to limit rotational movement of the male connector assembly in relation to the female connector assembly.

The component parts of the connector apparatus may be independently scaled according to a particular application. In particular, the lateral extent of the first and second pin portions (i.e. how far they reach away from the male longitudinal axis) and the corresponding lateral positions of the pin receptors (i.e. their distance away from the female longitudinal axis) may be varied independently of the diameter of the male and female connector assemblies.

The male connector assembly may be releasably connected to, or connectable to, the female connector assembly. The male and female connector assemblies may form part of a pre-tensionable connector apparatus according to the first aspect.

The upper end portion of the male connector assembly may include an attachment, such as an eyelet, by which the body can be pulled into the female connector assembly, in use. A pull line, such as a cable or chain may be attached to the attachment, by which the male connector assembly may be pulled into engagement with the female connector assembly, in use.

The tolerance to the range of angles, between the male longitudinal axis and the female longitudinal axis, from which the male and female assembly may be brought together may also be larger than known coupling apparatus, by virtue of the length between the upper end portion and intermediate portions of the male connector assembly, in comparison to the size of the aperture through the collar.

For example, the ratio of the length between the upper end of the male connector assembly and the intermediate portion (at its point closest to the upper end) and a diameter of the collar may be less than 3:1, or less than 2:1, or between around 3:1 and 1:1. For example the ratio may be around 1.5:1.

The lower portion of the male connector assembly may include a pivotable coupling, for coupling a mooring line to the male connector assembly. A pivotable coupling in use may accommodate motion of the mooring line and/or the vessel due to waves, current and the line.

The pivotable coupling may pivot around the first and second pin portions. That is to say, the first and second pin portions may form a part of the pivotable coupling.

Accordingly, the first and second pin portions perform the dual purpose of restriction rotation of the male connector assembly in relation to the female connector assembly; and accommodating motion between the vessel and the mooring line; due to currents, waves and the like in use.

The first and second pin portions may form part of a pin, extending through the male connector assembly, for example through one or more eyelets.

The pivotable coupling may include a clevis joint.

A clevis joint typically includes an outer coupling formations, such as the arms of a "yoke", each comprising spaced-apart co-axial eyelets, and an inner coupling formation sized to be inserted between the eyelets of the outer coupling formations, the inner coupling formation having a single eyelet, wherein the said eyelets are aligned and a pin extends through all of the eyelets such that the inner mating formation is able to pivot around the pin in relation to the outer coupling formations.

The clevis joint may include bearings or bushings between the eyelets and the pin, and/or spacers, washers or the like between the inner and outer coupling formations, for example to eliminate play or for lubrication.

Either the inner coupling formation or the outer coupling formations of the clevis joint may be rotatable together with the mooring line, in use.

The male connector assembly may include more than one pivotable coupling.

In some embodiments, the male connector assembly comprises two or more pivotable couplings in parallel (e.g. next to one another). More than one pivotable coupling in parallel may allow the male connector assembly to be coupled to more than one mooring line.

The two or more pivotable couplings are conveniently co-axial, and may comprise a single pin extending therethrough. Alternatively, the coupling apparatus may comprise more than one pin For example, the male connector assembly may comprise terminal coupling formations (each having an eyelet) and an intermediate coupling formation having an eyelet coaxial with the eyelets of the terminal coupling formations. The intermediate coupling formation and a said terminal coupling formation may together form the outer coupling formations of a first clevis joint. The intermediate coupling formation and the other said terminal coupling formation may together form the outer coupling formations of a second clevis joint.

Alternatively, or in addition, the male connector assembly may comprise at least one pivotable coupling in series with another pivotable coupling. The male connector assembly may comprise pivotable couplings in series which operate around orthogonal axes.

Such pivotable couplings in series having orthogonal axes may accommodate motion of the mooring line in relation to the male connector assembly in more than one direction (for example, any direction).

Pivotable couplings in series may comprise a medial member having a component of pivotable coupling at each end thereof, optionally orthogonal to one another. For example, a medial member as disclosed herein may include an inner coupling formation of a clevis joint at each end thereof, an outer coupling formation at each end thereof, or an inner coupling formation and an outer coupling formation.

The pivotable coupling may include a universal joint. A universal joint includes two pivotable couplings orthogonal to one another.

This can be achieved in a number of ways, including by way of an inner pin extending through an outer pin, wherein the universal joint includes a first outer coupling formation rotatable in relation to the outer pin and a second outer coupling formation rotatable in relation to the inner pin. A universal joint may include a cross piece or "spider" having pairs of coaxial and orthogonal pin portions (including, in accordance with the present disclosure, said first and second pin portions), about which each of two yokes may rotate. A universal joint may include orthogonal rotation axes offset from one another, such that the universal joint in effect includes two clevis joints in series, operating about the end regions of a medial member (or assembly).

An intermediate portion of the male connector assembly between the upper and lower end portions may be configured to cooperatively engage with the collar. The intermediate portion may for example comprise one or more tapered surfaces oriented in use towards one or more inner surfaces of the collar.

In some embodiments, the one or more tapered surfaces may define a frustocone. By this we also include embodiments in which a complete frustoconical surface is not defined.

The intermediate portion may for example comprise a frustoconical outer surface, or a plurality of radially tapered extending ribs, tapered upper surfaces of which define a frustoconical abutment (the edges of the ribs each extending along a notional face of a frustocone).

The collar may include a correspondingly configured (e.g. frustoconical) inner surface, which cooperatively engages with the intermediate portion in use.

The male connector assembly may include a connector body.

An upper portion of the connector body may include the attachment.

A lower portion of the connector body may comprise the first and second pin portions, extending laterally (typically radially) therefrom.

In embodiments wherein the first and second pin portions are portions of a pin, the pin may extend through the lower portion of the connector body.

An intermediate portion of the connector body may define the said tapered surface or surfaces, for cooperative engagement with the collar.

A lower portion the body may comprise components or one or more pivotable couplings, such as one or more said outer coupling formations, one or more inner coupling formations, or one or more terminal and intermediate coupling formations.

The body may be of unitary construction, for example cast or machined from a single block of material (such as steel or other metal or alloy material).

The female connector assembly may in use be positioned in fixed relation to an external structure, such as a part of a floating vessel, or a spacer structure as disclosed herein in relation to the first aspect.

The female connector assembly may be positioned along or at the end of a generally tubular structure, such as at the bottom of, or within, a tubular moon pool (also known as a "wet porch"; an opening in the hull of the vessel giving access to the water column). A moon pool need not be tubular however and may be any suitable size or configuration, for example to accommodate access for equipment other than the connector apparatus. A moon pool may comprise said tubular structure or spacer structure.

The female connector assembly may be adapted to be coupled to a said tubular structure. For example, the female connector assembly, optionally the connector collar thereof, may include a flange, by which the female connector assembly is secured to the tubular structure.

The connector apparatus may comprise said tubular structure.

The connector collar may be configured to engage around all or a portion of a periphery of the intermediate portion of the male connector assembly.

The pin receptors may be attached to, or formed integrally with, the connector collar.

The pin receptors may alternatively in use be attached to a structure adjacent to the connector collar, for example a flange to which the collar is attached, or an adjacent part of the hull of a vessel comprising the connector apparatus.

The pin receptors may in some embodiments be indents or recesses, optionally in the connector collar or an adjacent flange. In use, the first and second pin portions may rest in the indents/recesses.

Each pin receptor may comprise an abutting member extending in use below the connector collar (optionally also adjacent thereto).

The first pin receptor may comprise an abutting member positioned to restrict (or substantially prevent) rotation of the first pin portion in a first direction and the second pin receptor may be positioned to restrict rotation of the second pin portion in an opposite second direction, when the male connector assembly is coupled to the female connector assembly.

In use, the first pin portion may engage with the first pin receptor abutting member when the second pin engages with the second pin receptor abutting member.

Each of the said pin receptors may include at least one pair of abutting members, positioned to restrict rotation of the respective pin portion in both directions, when the male connector assembly is coupled to the female connector assembly.

The female connector assembly may comprise a guide arrangement associated with each of the first and second pin receptors, for guiding the respective pin portions into the pin receptor. Each guide arrangement may be configured to capture and guide a pin portion towards its final position in the respective pin receptor, when the male connector assembly is pulled towards the female connector assembly from a range of angles (between the male connector assembly's orientation as it approaches the female connector assembly, and its final orientation). A degree of lateral tolerance may thereby also be provided.

By this we include a range of angles between the female longitudinal axis and a notional line drawn between a position of a pin portion when the male connector assembly is not coupled to the female connector assembly (during a process of coupling the connector assemblies together) and the position of the pin portion when the male and female assemblies are coupled to one another.

Such tolerance to a range of angles of approach of the male connector assembly towards the female connector assembly assists in connecting the assemblies, and so mooring a vessel, despite water currents, waves and the like.

The guide arrangements may form part of the pin receptors. For example, a pin receptor may include an abutting member, with a bevelled surface extending from a lower part of the abutting member upwards at an angle to and towards the female longitudinal axis.

A guide arrangement comprising a pair of abutting members may include opposed guide arrangements having ramped surfaces. Thus, the guide arrangements may together define a tapered entrance to the pin receptor.

In some embodiments, the pin receptors, comprising guide arrangements, each comprise two pairs or abutting members, and may be formed from a single piece of material having a U-shaped cross section (e.g. pressed from a sheet of material, or cut from a U-shaped beam). Multiple points of contact between the pin receptors and the first and second pin portions are thereby provided by a robust and simple to manufacture component. Moreover, a fixing point for one or more a rivet, spot welds or bolts is provided between the pairs of abutting members, for attaching the pin receptors.

Whilst various component parts of the male and female connector assemblies are conveniently symmetric around their respective longitudinal axes, optionally substantially circularly symmetric, this is not essential. Similarly, the male and female longitudinal axes may align with one another when the male and female connectors are coupled together in use, and the male and female connector assemblies may be generally co-axial.

A pull line may be attached to the male connector assembly via the attachment at the upper end of the connector assembly, by which the male connector assembly may be pulled into cooperative engagement with the female connector assembly.

The pull line may for example comprise a length of cable or chain.

The pull line may include a coupling portion, for example comprising a latch pin aperture extending therethrough, from a first side to a second side thereof, sized to receive a latch pin. Where the pull line is pulled taut via the latch pin aperture, the pull line may extend in an orientation generally perpendicular to an axis through the latch pin aperture.

The connector apparatus may comprise a pre-tensioning arrangement, for applying a pre-tensioning force between the male and female connector assemblies.

The pre-tensioning arrangement may be positioned in fixed relation to the second, female connector assembly. The pre-tensioning arrangement may for example be coupled to, or accessible via, the said moon pool. The pre-tensioning arrangement may be positioned adjacent an upper end of the moon pool, for convenient access to personnel on the deck of or within a vessel.

The pull line may be of a length sufficient such that, when the male and female connector assemblies are cooperatively engaged, the coupling portion thereof can be coupled to the pre-tensioning arrangement, and the pre-tensioning force applied.

When the male and female connector assemblies are engaged, the length of the pull line may be selected such that, when taut, the coupling portion is above the pre-tensioning arrangement, in some embodiments, the first configuration thereof. The pre-tensioning arrangement may then, in use be reconfigured to couple to the coupling portion and apply the pre-tensioning force.

The invention extends in a third aspect to a moon pool for a floating vessel, the moon pool comprising:
 a tubular structure having an upper and a lower end and defining a longitudinal axis; and
 connector apparatus according to the first aspect and/or the second aspect.

The moon pool may comprise a female connector assembly at or proximal to the lower end of the tubular structure.

The female connector assembly may define a female longitudinal axis and having a connector collar configured to cooperatively engage around an intermediate portion of a male connector assembly; the female connector assembly comprising a first pin receptor on a first side of the female connector assembly and a second pin receptor on an opposite second side of the female connector assembly; wherein the pin receptors are configured to engage with outwardly extending pins of a said male connector assembly.

The female longitudinal axis may be coaxial with the longitudinal axis of the tubular structure.

The moon pool may comprise a pre-tensioning arrangement positioned in fixed relation to the female connector arrangement, at or proximal to the upper end of the tubular structure; the pre-tensioning arrangement being reconfigurable between a first configuration and a second configuration, wherein when the pre-tensioning arrangement is coupled to the pull line by the coupling apparatus, and the pre-tensioning arrangement is in the second configuration the said-pre tensioning force is applied by the pre-tensioning arrangement between the first and second connector assemblies, as disclosed herein in relation to the first aspect.

In use, the moon pool may further comprise a male connector assembly.

The male connector assembly may be connected, typically via an upper end portion, to a pull line, by which the male and female connector assemblies may in use be pulled into engagement with one another. In use the pull line may extend through the tubular structure.

The pull line may comprise a coupling portion being adapted to be coupled to the pre-tensioning arrangement by coupling apparatus.

The male connector assembly may have an upper end portion for attachment to a pull line; and a lower end portion for attachment to a mooring line; a first pin portion extending from the connector body normal to a male longitudinal axis extending between the upper and lower ends of the connector body; and a second pin portion extending from an opposite side of the connector body normal to the male longitudinal axis; the male assembly being couplable to the female connector assembly;
 wherein, when the male connector assembly is connected to the female assembly, the collar cooperatively engages around the intermediate portion of the male connector assembly, the first and second pin portion engage with the respective first and second pin receptors.

A mooring line may be attached to the male connector assembly. The mooring line may be attached to the male connector assembly via the pivotable coupling, optionally via two or more pivotable couplings in series.

The mooring line may be retained at the sea bed by an anchor.

Two or more mooring lines may be attached to the male connector assembly.

In a fourth aspect of the invention there is provided a floating vessel comprising the moon pool of the third aspect.

The moon pool may extend through the hull of the vessel, such that the lower end of the moon pool is submerged. Accordingly, the female connector assembly and male connector assembly may in use be submerged.

The upper end of the moon pool may be on a deck of the vessel, or within the vessel.

The moon pool may be of wider diameter than the tubular structure, for example to facilitate connection of other services, such as power distribution cables.

The vessel may be a floating water current power generator, such as a tidal turbine. The vessel may include downwardly depending support structures to which are mounted nacelles and rotatable turbines. The turbines may be configured to have adjustable or reversible pitch. The floating water current power generator may for example be generally as disclosed in WO2009/141617 (Scotrenewables (Marine Power) Limited), or as disclosed in WO 2018/115806 (Orbital Marine Power Limited).

Floating vessels of this type are subject to large forces applied by water currents, which may act to move the male and female coupling assemblies in relation to one another, by causing pitch or roll and consequent tension via the mooring lines. Pre-tensioning forces reduce or eliminate any such movement between the male and female connection assemblies.

The invention is not restricted to any particular type of vessel, however, any may be used for example in connection with a floating wind turbine, a wave generator, a floating offshore production platform or service vessel or the like.

The vessel may include more than one moon pool. For example, the vessel may include a moon pool at or near the bow of the vessel and/or at or near the stern of the vessel.

A fifth aspect of the invention relates to a method of connecting the pre-tensionable connection apparatus of the first aspect, comprising:
bringing the first connector assembly into engagement with the second connector assembly;
coupling the pull line to the pre-tensioning arrangement;
reconfiguring the pre-tensioning arrangement from the first configuration to the second configuration; and
applying a pre-tensioning force between the first and second connector assemblies via the pre-tensioning arrangement, when the pre-tensioning arrangement is in the second configuration.

The method may comprise coupling the pull line to the pre-tensioning arrangement when the pre-tensioning arrangement is in the first configuration; and reconfiguring the pre-tensioning arrangement from the first configuration to the second configuration, to apply the pre-tensioning force.

The method may comprise reconfiguring the pre-tensioning arrangement to both bring the first and second connector assemblies into full engagement (by which we mean their final positions in relation to one another) and apply the pre-tensioning force.

The method may comprise applying a first force to the pull line between the first and second connector assemblies, wherein the first force is equal to or greater than the pre-tensioning force, coupling the pre-tensioning arrangement to the pull line, reconfiguring the pre-tensioning arrangement from the first to the second configuration and releasing the first force, whereby the pre-tensioning force such that the pre-tensioning force between the first and second connector assemblies is maintained by the pre-tensioning arrangement, in the second configuration thereof.

In some embodiments, the pre-tensioning arrangement is coupled to the pull line when the pre-tensioning arrangement is in the first configuration. In some embodiments, the pre-tensioning arrangement is coupled to the pull line when the pre-tensioning arrangement is in the second configuration.

The method may comprise tensioning the pull line, for example using a winch secured to the pull line (e.g. to the coupling portion), then coupling the pull line to the pre-tensioning arrangement. Where the pull line is tensioned by applying the first tensioning force before coupling to the pre-tensioning arrangement, the tensioning is then released such that the pre-tensioning force remains and is applied or maintained by (i.e. in such embodiments taken up by) the pre-tensioning arrangement.

The pull line may be tensioned prior to coupling to a smaller amount than the pre-tensioning force ultimately applied by the pre-tensioning arrangement. For example, the pull line may be tensioned, the pre-tensioning arrangement coupled thereto; the pre-tensioning arrangement optionally at least partially reconfigured, the tensioning released, and the pre-tensioning arrangement further reconfigured to increase the applied tension to the pre-tensioning force.

As disclosed herein, the method may comprise temporarily over tensioning the pull line (i.e. by a first tensioning force greater than the pre-tensioning force), then coupling the pre-tensioning arrangement and the pull line, reconfiguring the pre-tensioning arrangement and then releasing the over tensioning applied to the pull line.

The method may comprise placing a latch pin through a latch pin aperture in the coupling portion. The method may comprise engaging the pre-tensioning arrangement with the latch pin to the first and the second sides of the coupling portion.

The latch pin may be inserted through the latch pin aperture before, or after, the coupling portion has been moved adjacent to the pre-tensioning arrangement.

The method may comprise pulling the pull line to bring the first and second coupling assemblies into engagement with or into proximity to one another. In some embodiments, a pilot line may be attached to the pull line and the pilot line used to pull the pull line and bring the first and second connector assemblies into engagement with or proximity to one another.

The method may comprise pulling the pull line via a moon pool on a floating vessel. Thus, the pull line may be pulled from above the water line of the floating vessel, to bring a sub-surface first connector assembly into engagement with or proximity to the second connector assembly.

When connected together, the first and second connector assemblies may share a common axis. The method may comprise bringing them into engagement from non-axially aligned positions (non-aligned in terms of their orientation and/or lateral positions). A flexible pull line facilitates the alignment of the first and second connector assemblies.

As disclosed herein, the connector assemblies may be provided with tapered surfaces to facilitate alignment, and provide some degree of tolerance to being urged together from non-aligned positions.

According to a sixth aspect of the invention there is provided a method of coupling a first, male connector assembly to a second, female connector assembly:
the male connector assembly having a male longitudinal axis, a first pin portion extending from the male connector assembly normal to the male longitudinal axis and a second pin portion extending from an opposite side of the male connector assembly normal to the male longitudinal axis;
the female connector assembly having a connector collar, the connector collar defining a female longitudinal axis; a first pin receptor spaced from the female longitudinal axis on a first side of the female connector assembly and a second pin receptor spaced apart from the female longitudinal axis on an opposite second side of the female connector assembly;
the method comprising:
moving an intermediate portion of male connector assembly and the collar into cooperative engagement one another;
engaging the first pin portion with the first pin receptor; and
engaging the second pin portion with the second pin receptor.

The first and/or second pin portions may engage with the respective pin receptor before, or substantially simultaneously with cooperative engagement between the intermediate portion and the collar.

The method may comprise pulling the male connector assembly. The male connector assembly may be pulled via a pull line, coupled to an upper portion of the male connector assembly. The pull line may be pulled through the collar. The pull line may be pulled through the collar via a moon pool.

The male connector assembly may be pulled into engagement with the female connector assembly from above the female connector assembly; i.e. such that the male connector assembly approaches from below.

The method may comprise moving the male connector assembly and the female connector assembly towards each other with the male and female longitudinal axes substantially aligned, at least in the latter part of their approach.

In some embodiments, the male and female longitudinal axes may be misaligned, within an angular or lateral range of tolerance, until at least a part of the male and female connector assemblies come into contact.

The method may comprise aligning the male and female longitudinal axes. The male and female longitudinal axes may be aligned, at least in part, by bringing the collar into cooperative engagement with the intermediate portion.

The method may comprise rotating the male connector assembly in relation to the female connector assembly, while bringing them into engagement with one another.

The male and female connector assemblies may be rotated in relation to one another, and/or at least in part longitudinally aligned with one another, by the pin portions impinging upon guide arrangements associated with each of the pin receptors. The guide portions may rotate the pin portions into alignment with the pin receptors.

The method may comprise attaching a line to a lower end of the male connector assembly. The line may be a mooring line.

The line may be attached to the lower end of the male connector assembly via at least one pivotable coupling. The method may comprise pivoting the pivotable coupling between the male connector assembly around the axis through the first and second pin portions. Such pivoting may occur, for example, as male and female connector assemblies are brought together.

The method may comprise pre-tensioning the male connector assembly against the female connector assembly, after cooperative engagement with one another.

The method may comprise pulling a coupling portion of the pull line into a position in which it can be coupled to a pre-tensioning arrangement. The method may comprise applying a pre-tensioning force between the male and female connector assemblies.

The pull line may be attached to a pilot line. A pilot line need be of sufficient strength only to bear the weight of the male connector assembly and associated apparatus (e.g. pivotable couplings, mooring line(s), pull line and terminator) while the connector assemblies are brought together.

Alternatively, and as discussed above, the pilot line may be capable of temporarily over tensioning the pull line.

The method may comprise reconfiguring the pre-tensioning arrangement to apply the pre-tensioning force.

The method of the fifth or sixth aspect may be a method of connecting a mooring line to a floating vessel.

The method may comprise connecting the mooring line to the first connector assembly, and pulling the first (optionally male) connector assembly while the first connector assembly is submerged. The first connector assembly may be pulled upwards, from a position below the floating vessel.

The vessel may comprise a moon pool, and the connector apparatus may be accessible via the moon pool. The method may therefore comprise pulling the first connector assembly upwards, via a pull line and/or pilot line extending upwards through the moon pool.

The method may comprise connecting a further line, such as an electrical conduit (e.g. a power distribution conduit) to or through the first connector assembly. For example, in some embodiments the first connector assembly may include one or more further channels therethrough to permit passage of said one or more further lines.

The one or more further lines may be connected before, or after pre-tensioning.

The method of the fifth and/or sixth aspect may also be conducted in a reverse order, so as to decouple the first and second connector assemblies. In so far as the sequence of steps to couple the male and female connector assemblies may be varied, the sequence of steps of decoupling may also be varied, and not be conducted in the same sequence as the steps of coupling.

The method of the fifth and sixth aspects may comprise use of the apparatus disclosed herein in relation to the other aspects. The method of the fifth aspect may comprise the further steps of the method of the sixth aspect, and vice versa.

It should be understood that optional features disclosed in relation to each aspect of the invention correspond to optional features of each other aspect of the invention. For example, corresponding optional features of the apparatus of the first through fourth aspect of the invention correspond to optional features of each other of the first through aspects. Moreover, where the function and operation of the various features of the apparatus disclosed herein are discussed, it should be appreciated that the methods disclosed herein may include corresponding steps of such function or operation of the apparatus.

Terms such as upper, lower, above or below are relative terms referring to the orientation of a connector apparatus in its orientation in normal use. The skilled person will understand that variations in orientation of the apparatus may be used in certain applications. For example, a said longitudinal axis may in some embodiments be non-vertical (in relation to the orientation of the vessel when not otherwise perturbed, for example by waves, current impinging of turbines, loading or otherwise). It will be further understood that the operating conditions may cause the orientation of the apparatus disclosed herein to vary.

DESCRIPTION OF THE DRAWINGS

Example embodiments will now be described with reference to the following figures in which.

DETAILED DESCRIPTION

Figure 1:
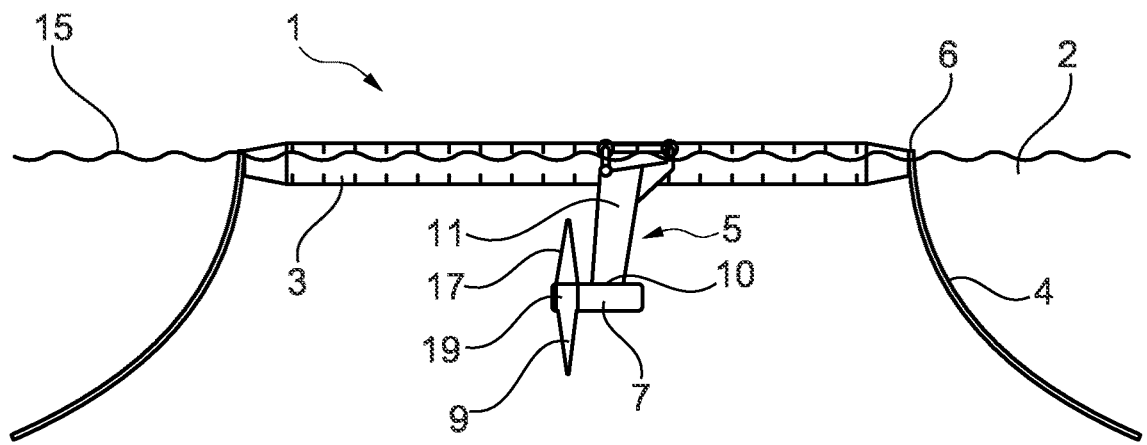
FIG. 1 shows a floating water current power generator.

FIG. 1 shows a side view of a floating vessel 1, in this instance a water current power generator 1, extracting energy from flowing water. In normal use, the apparatus floats on a body of water 2 and is moored to the bed (not shown) of the body of water via mooring line, in this instance cables 4, attached to eyelets 6, in a conventional manner.

The vessel 1 is a marine tidal turbine, adapted to extract energy from a tidal flow. The vessel has a buoyancy vessel 3, and a turbine assembly 5 coupled to each side of the buoyancy vessel. Each turbine assembly 5 has a nacelle 7, to which a turbine rotor 9 is rotatably mounted. The rotors 9 comprise rotor blades 17 attached to a hub 19. The nacelle 7 is coupled to the outboard end 10 of a support structure 11. At its inboard end 12, the support structure is coupled to the buoyancy vessel 3. The forces applied to the buoyancy vessel 3 by water flowing past the rotors 9 can be considerable.

Figure 2:
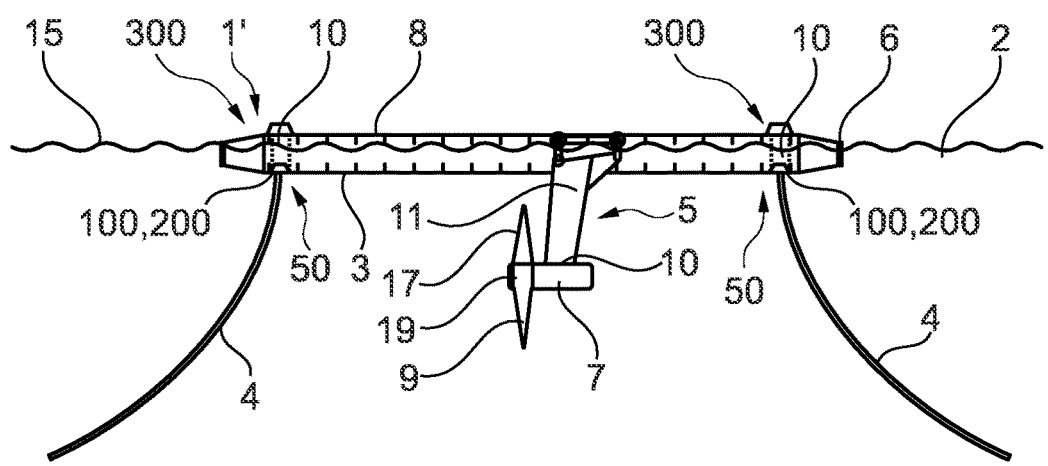
FIG. 2 shows a floating vessel (a further water current power generator) comprising connection apparatus in bow and stern moon pools.

FIG. 2 shows a side view of a floating vessel 1', having a moon pool 10 towards the bow and stern sections thereof (shown in outline), which incorporates an embodiment of connection apparatus 50, which provides for improved engagement with a mooring line and facilitates connection of the mooring line when the vessel is moving for example due to waves.

In this embodiment, the cables 4 are attached to the lower portion of a male connector assembly 100, which is coupled to a female connector assembly 200 at the base of the moon pool. The male and female connector assemblies 100, 200 are pre-tensioned against one another, by a pre-tensioning arrangement indicated generally as 300.

The features of the male and female connector assemblies 100, 200 and the pre-tensioning arrangement 300 will be described in further detail below, with reference to FIGS. 3-10.

Figure 3:
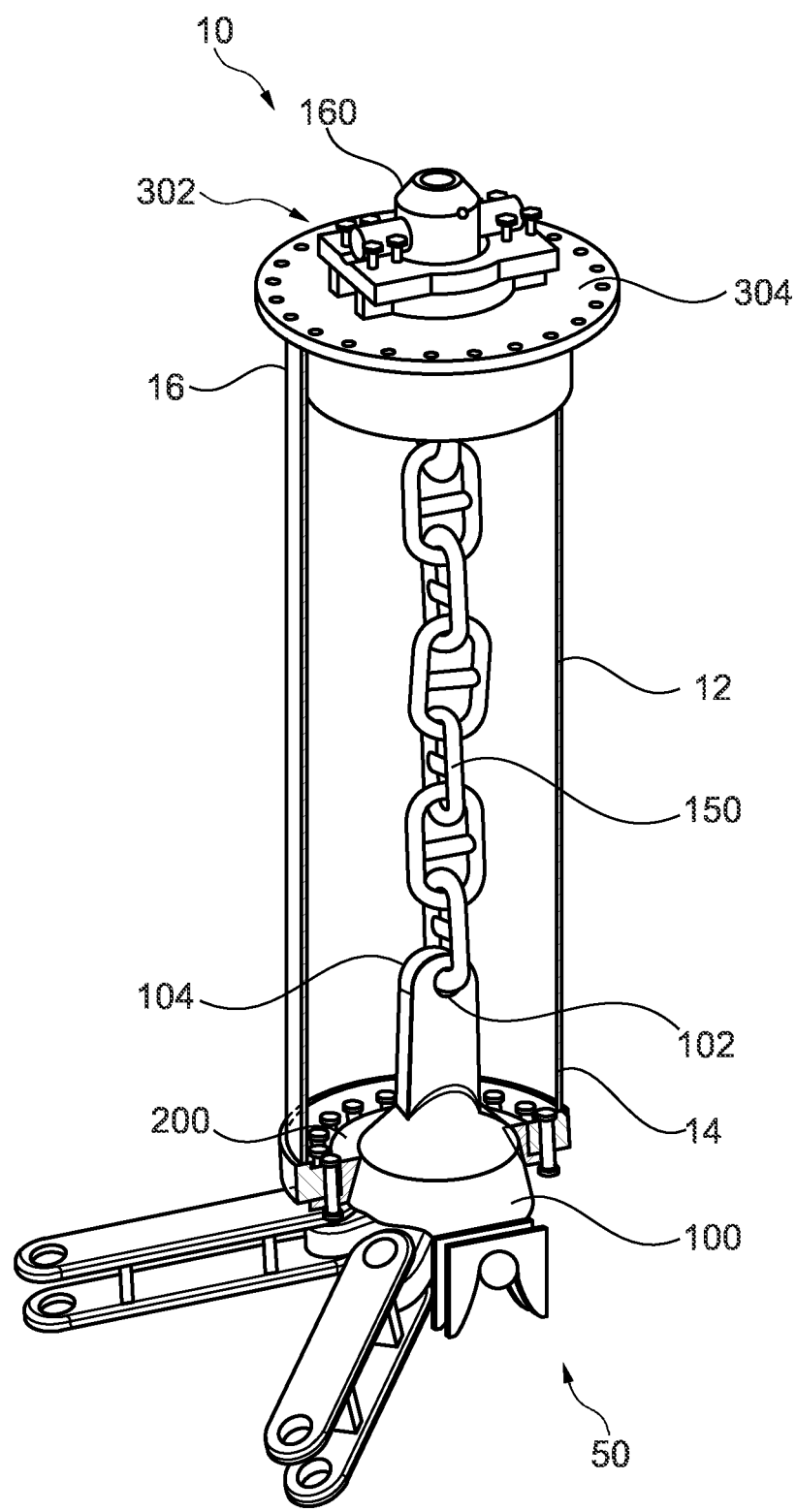
FIG. 3 shows a cross sectional perspective view of a moon pool, comprising connection apparatus.

FIG. 3 shows a perspective cross sectional view of a moon pool 10. The moon pool has a tubular structure 12, which extends through the hull of the buoyancy vessel 3, in this embodiment through to the upper deck 8.

The connection apparatus 50 includes, attached to the lower end 14 of the tubular structure, male and female connector assemblies 100, 200. A pull line 150 (in this instance, a chain) extends from an attachment (eyelet 102) at the upper end portion 104 of the male connector assembly, along a longitudinal axis L to a pre-tensioning arrangement 302, at the upper end 16 of the tubular structure 12. In the embodiment shown the pre-tensioning arrangement is secured directly to the tubular structure, which serves in part to act as a spacer to maintain the pre-tensioning arrangement 302 in fixed relation to the female connector assembly 200. In alternative embodiments, the pre-tensioning arrangement may be attached to another part of the vessel 1.

In the configuration shown, the connector assemblies 100, 200 are cooperatively engaged and a pre-tensioning force to hold them together is applied by the pre-tensioning arrangement 302, via the pull line 150.

FIGS. 4(*a*) and 4(*b*) show a perspective view of the connector apparatus 50 at the lower end 14 of the tubular structure, with FIG. 4(*b*) shown in partial cross section. The male connector assembly 100 includes a connector body 101. An intermediate portion 106 of the body 101 is cooperatively engaged with a collar 202 of the female connector assembly 200.

A first pin portion 108 of a pin 110 extends laterally from the male connector assembly 100, normal to a male longitudinal axis M extending through the assembly 100. A second pin portion of the pin 110 extends laterally from the opposite side of the assembly 100 and is not visible in the figure.

The collar 202 of the female connector assembly 200 is attached by a flange portion 204, to a corresponding flange 18, at the bottom of the tubular structure, by bolts 20. The collar 202 defines a female longitudinal axis F, and is profiled so as to cooperatively engage with the intermediate portion 106 of the body 101.

The female connector assembly 200 also includes a first pin receptor 208, which is connected to and extends below the flange portion 204. A second pin receptor is positioned on the diametrically opposite side of the female connector assembly 200.

When the male and female connector assemblies 100, 200 are coupled so that the collar 202 cooperatively engages the intermediate portion 106, as in FIGS. 4(*a*) and (*b*), the first pin portion 108 is engaged with the first pin receptor 208, and the second pin portion engages with the second pin receptor on the opposite side of the apparatus 50. The interaction between the pin portions and pin receptors restricts rotational motion between the male and female connector assemblies.

Figure 5:
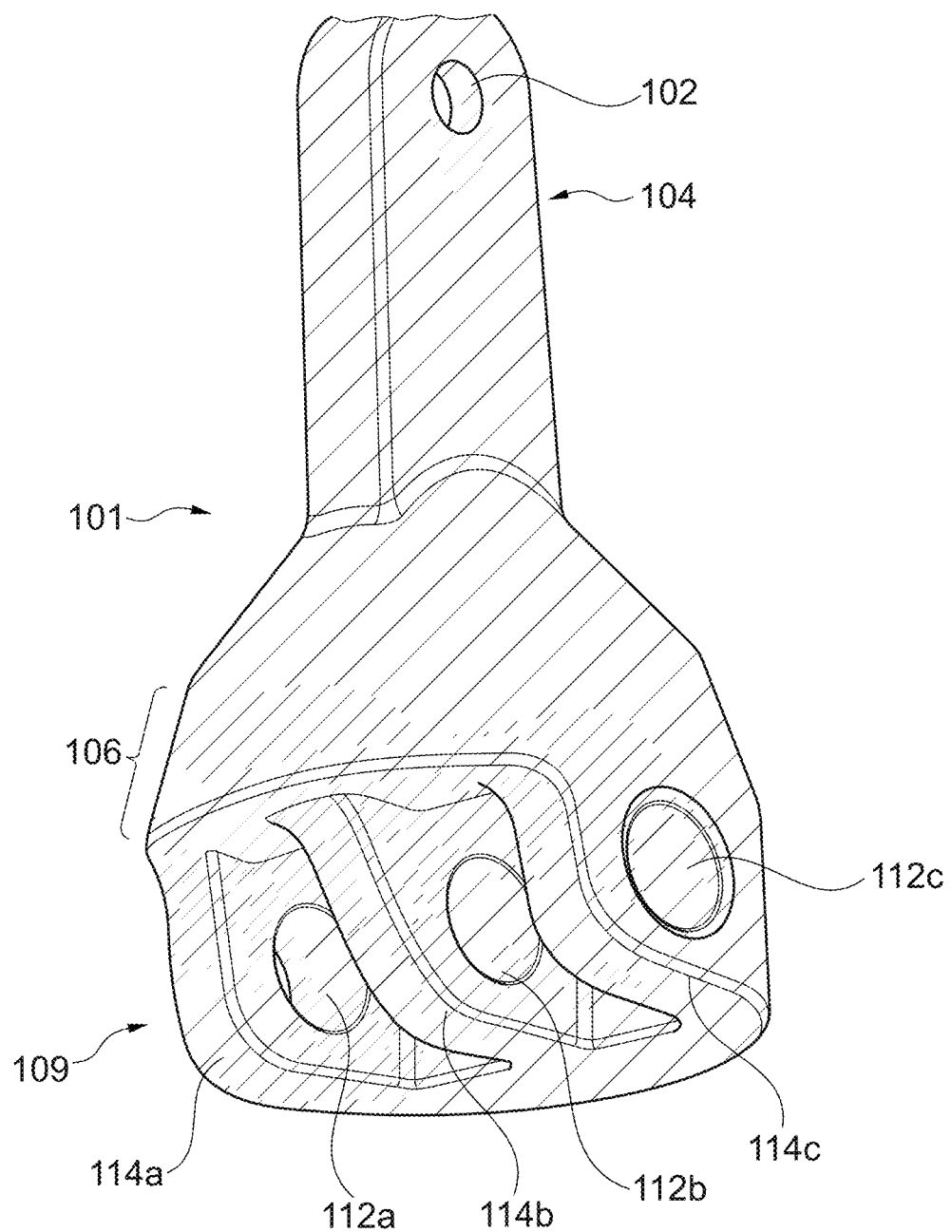
FIG. 5 shows a perspective view of a body of a male connector assembly.

FIG. 5 shows a perspective view of the body 101 of the male connector assembly. The body has an upper end portion 104, which includes an eyelet 102 for attachment to the pull line 150. The intermediate portion 106, includes a tapered, frustoconical surface 106', angled towards the collar 202 in use.

The lower end portion 109 of the body 101 is provided with a series of co-axial eyelets 112*a-c*, sized to receive the pin 110. The eyelets extend through corresponding outer coupling formations 114*a*, 114*c* and an intermediate coupling formation 114*b*. The coupling formations form the female components of pivotable couplings, which are able to rotate around the pin 110.

Figure 6:
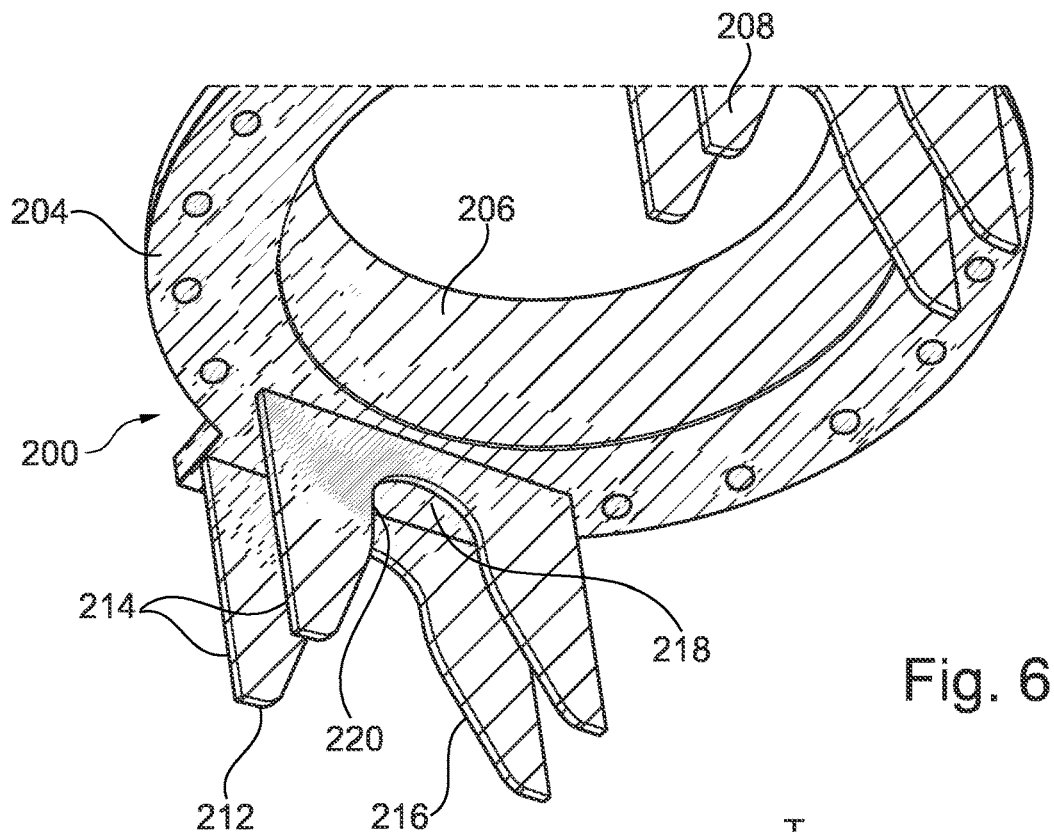
FIG. 6 shows a perspective view of a female connector assembly.

FIG. 6 shows a perspective view from below the female connector assembly 200, showing more clearly an inwardly facing, frustoconical surface 206 configured to cooperatively engage with the corresponding surface 106' of the body 101.

The first 208 and second 212 pin receptors can also be seen in FIG. 6(*b*). The pin receptors are formed as a U-shaped member, which defines pairs of abutting members 214 extending below the collar. A bolt hole 220 is located at the "base" of the U-shaped portion of each of the receptors 208, 212, by which they are bolted to the flange portion 204 and the flange 18.

Each of the members 214 include a ramped guide surface 216, which serve in use to guide the pin portions towards their final positions in the rounded recess 218 at the base of each pair of abutting members 214. In the embodiment shown, the opposed ramped guide surfaces 216 define a tapered entrance to the pin receptors 208, 212, which narrows towards the recesses 218.

The abutting members 214 are thus able to "capture" an approaching pin portion from within a range of rotational angles (i.e. between an axis defined along the pin portions, or pin, and extending between the recesses 218), as the male and female connector assemblies are moved together. In addition to this rotational tolerance, a degree of lateral tolerance is also provided by the ramped surfaces (i.e. distance between the axis along the pin portions and the female longitudinal axis, as the male connector assembly approaches.

The length of the connector body along the axis M is also relatively small, in comparison to its width. In particular, the longitudinal distance along the male longitudinal axis M between the intermediate portion 106 and the upper end 105 of the male connector assembly 100 is relatively small compared to the diameter (at its narrowest point) of the collar 202. In the embodiment shown, the ratio of this length to diameter is around 3:1.

Figure 7:
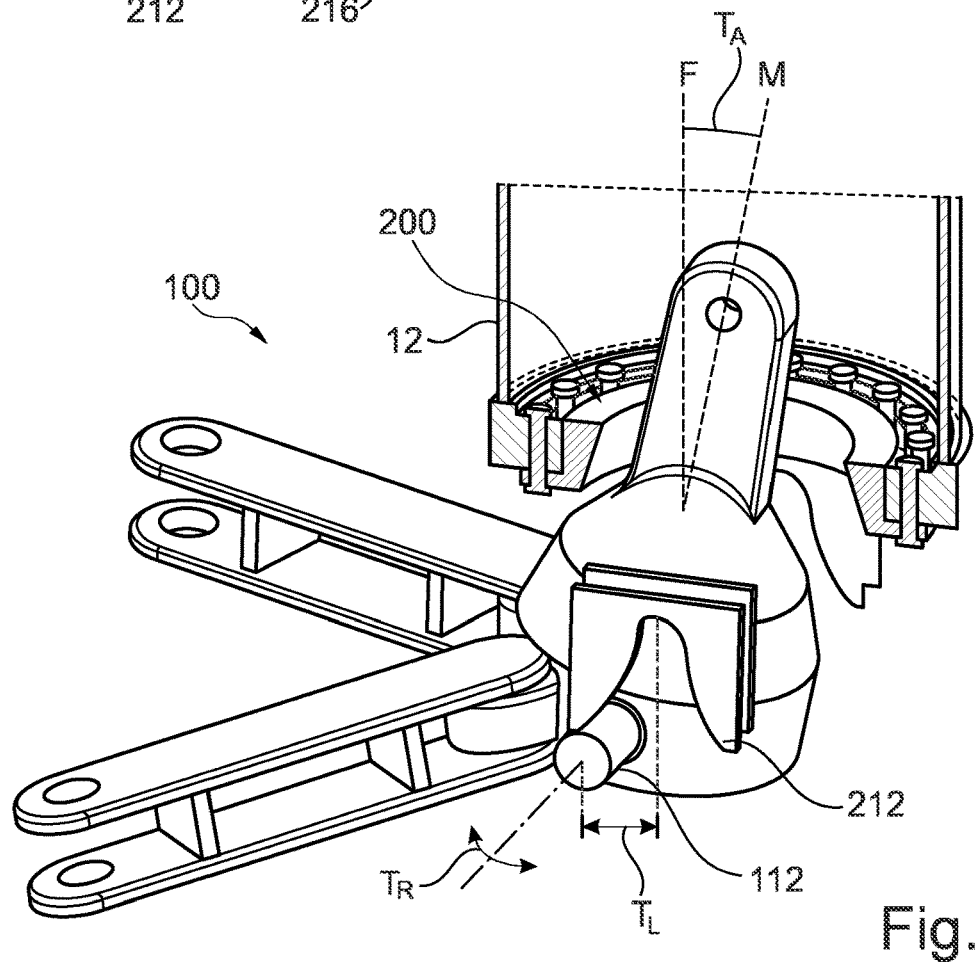
FIG. 7 shows the connector apparatus while the male connector assembly is being pulled towards the female connector assembly.

FIG. 7 shows the connector apparatus while the male connector assembly is being pulled towards the female connector assembly. The pull line 150 is omitted for clarity. FIG. 7 illustrates the lateral ($T_L$, rotational ($T_R$) and angular ($T_A$) tolerance provided by the above described dimensions of the male connector assembly in relation to the female connector assembly; and the guide arrangements associated with the pin receptors.

Figure 8:
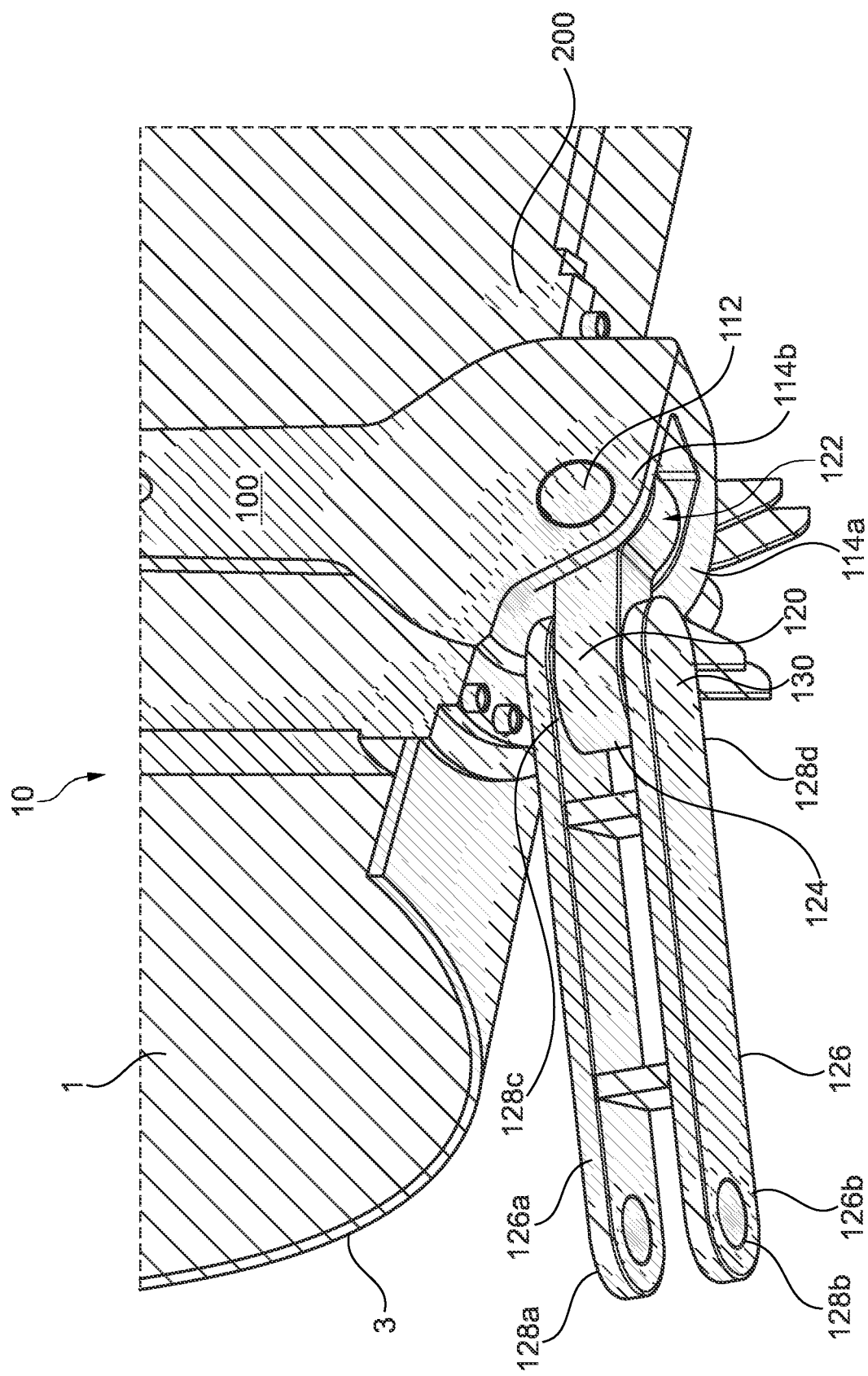
FIG. 8 shows a perspective cross sectional view of the connector apparatus, viewed from below the vessel of FIG. 2.

FIG. 8 shows a further perspective cross sectional view of the apparatus 50, viewed from below the vessel 1', with the male and female connector assemblies 100, 200 cooperatively engaged.

The male connector assembly 100 includes a pivotable coupling at its lower end portion, which includes a medial member 120, having an eyelet 122 through which the portion 112 of the pin 110 extends. The medial member 120 is pivotable around the pin 110.

At the opposite end of the member 120, is another eyelet 124, perpendicular to the eyelet 122.

The assembly 100 further incudes a connecting arm 126, having plates 126a and 126b, with eyelets 128a-d at the ends thereof. A connector pin 130 extends through the eyelets 128c, 124 and 128d, to pivotably couple the connecting arm 126 to the medial member 120, and thereby provide a further pivotable coupling is provided in series with the coupling around the pin 110. The medial member 120 in effect provides the inner part of a clevis joint at each of its ends, with the outer parts being provided at one end by the formations 114a and 114b, and at the other end by the ends of the connecting plates 126a and 126b.

At the distal ends of the plates 126a,b, a mooring line 4 can be connected (not shown), via a pin, in a conventional manner.

Figure 4A:
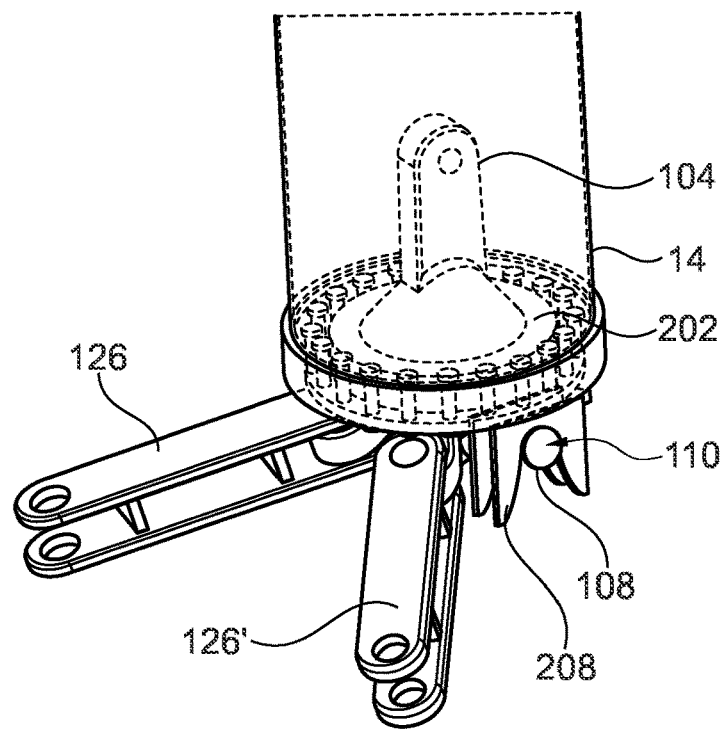
FIGS. 4(a) and 4(b) show perspective "X-ray" and partial cross sectional views of a connector assembly.
Figure 4B:
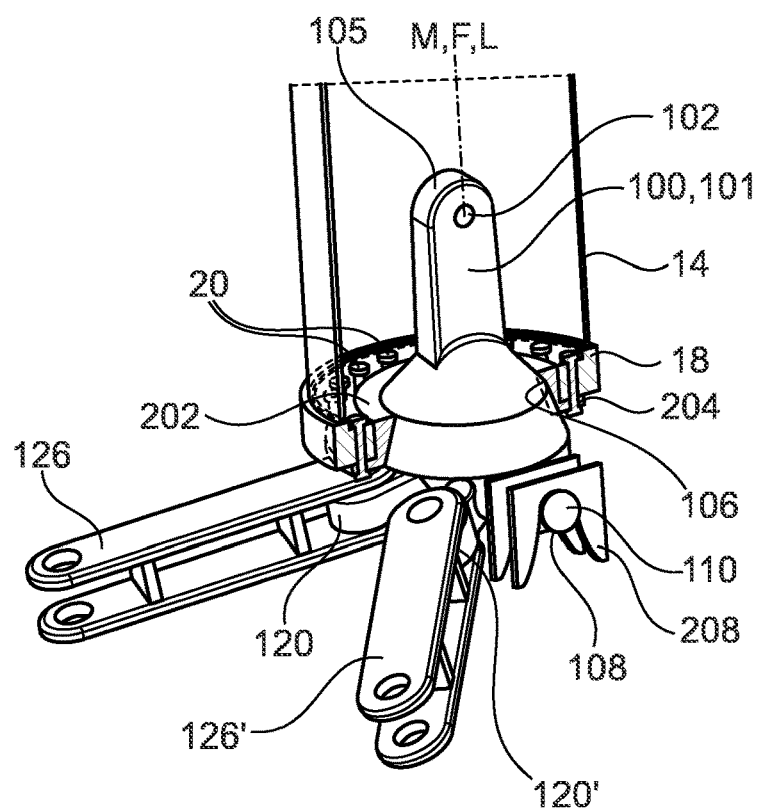

As can be seen in most clearly in FIGS. 4(a)-(b) and 7, the male connector assembly also includes two pairs of pivotable couplings in parallel, including a medial member 120' and connecting arm 126' similarly coupled to the pin portion 108, between the formations 114b and 114c of the body 10. Accordingly, in the embodiment shown, two mooring lines may be connected to the male connector assembly 100.

Figure 9:
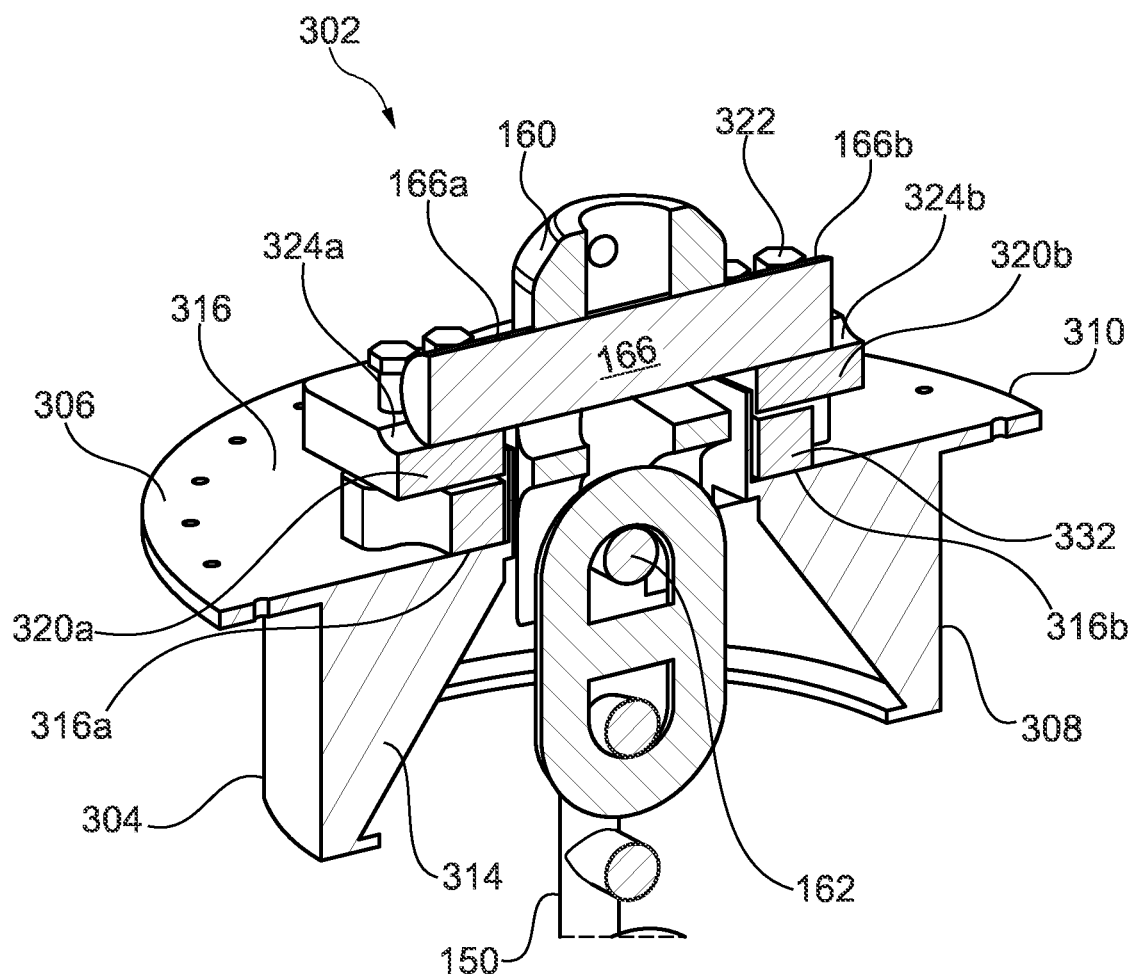
FIG. 9 shows a perspective cross sectional view of a pre-tensioning arrangement for applying a pre-tensioning force between connector assemblies.
Figure 10:
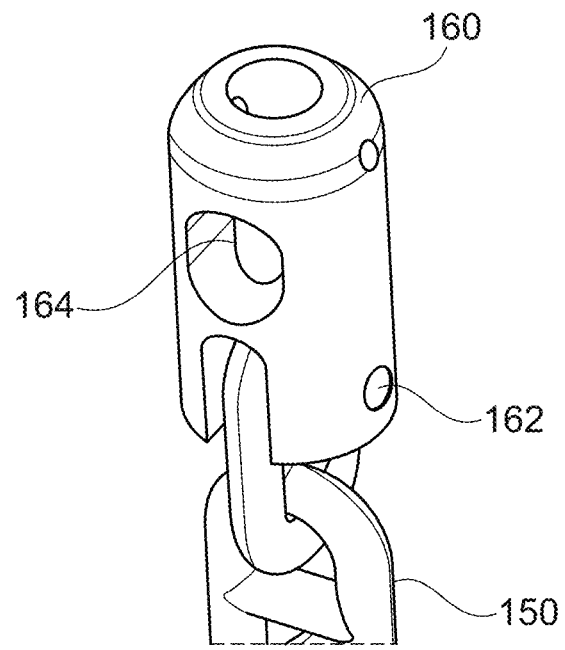
FIG. 10 shows a coupling portion at the end of a pull line.

FIG. 9 shows a perspective cross sectional view of the pre-tensioning arrangement 302. FIG. 10 shows a coupling portion 160 at the end of the pull line.

The pre-tensioning arrangement 302 includes a support plate collar 304, having an outer flange 306 by which the support plate collar 304 is fixed to the top of the tubular structure 112, to maintain the pre-tensioning arrangement in fixed relation to the female connector assembly.

The support plate collar 304 includes a lower liner section 308 which extends into the top part 116 of the tubular structure, and an upper section 310, which defines a port 312 to the moon pool. Triangular bracings extend between the upper section 310 and the liner section 308, around the port 312, to distribute pre-tensioning forces and other loadings applied via the pull line, in use. The uppers surface of the upper section 310 defines a support plate 316, having first and second support plate regions 316a and 316b, on opposite sides of the port 312. In alternative embodiments, separate first and second support plates may be provided.

A jacking plate collar 320 is slideably mounted above the support plate 316, on bolts 322. The jacking plate collar 320 defines first and second jacking plate regions 320a and 320b, above the first and second support plate regions 316a and 316b.

The coupling portion 160 is attached at its lower end to the pull line. In the embodiment shown, the pull line is a length of chain 150 secured within a clevis in the lower end of the coupling portion 160 by a pin 162.

The coupling portion further includes a latch pin aperture 164, extending therethrough. When the coupling portion 160 is aligned with the pull line, the latch pin aperture is perpendicular to the pull line. A latch pin 166 extends through the latch pin aperture, and the lengths of the pin 166a and 166b extending to either side of the coupling portion 160, rest upon the first and second jacking plate portions 320a and 320b. A recess 324a, 324b is provided on each jacking plate portion, to assist in seating the latch pin.

Figure 11:
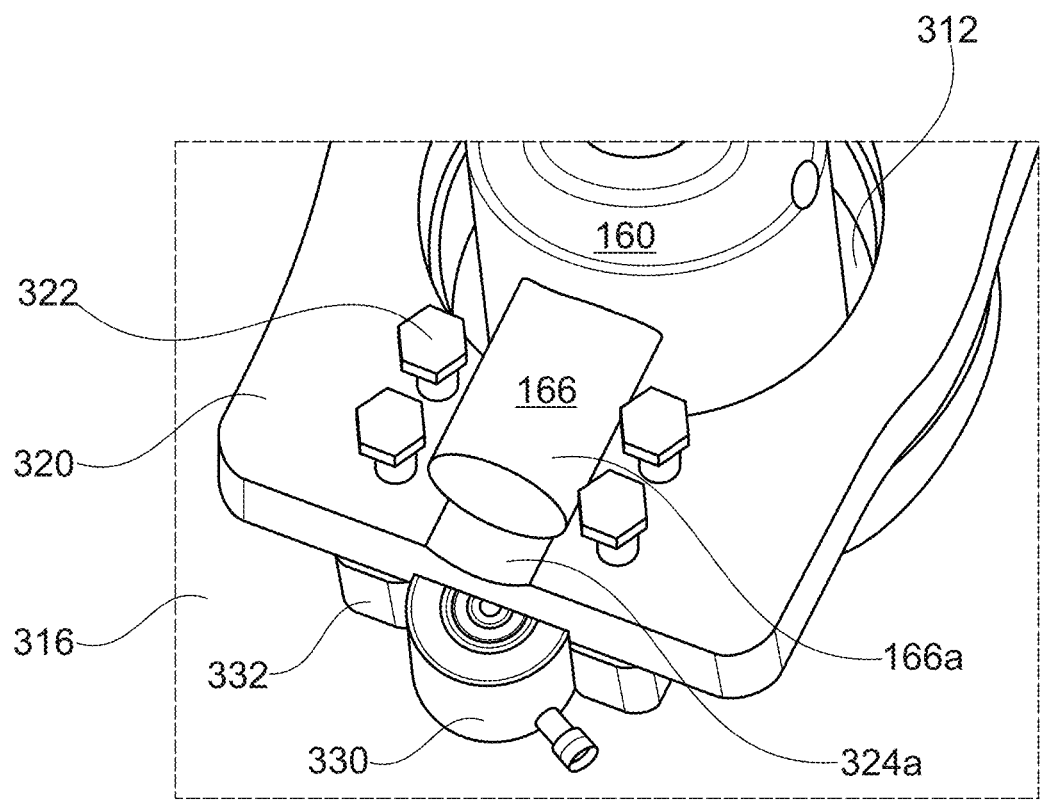
FIG. 11 shows a perspective view of a pre-tensioning arrangement, from above.

Hydraulic jacks 330 are disposed between the support plate 316 and the jacking plate 320, (see FIG. 11) and may be extended to reconfigure the pre-tensioning apparatus form the first configuration shown in the figure to the second configuration in which the jacking plates abut the ends of the bolts 322. Other means of reconfiguring the pre-tensioning arrangements disclosed herein may also be used, such as screw actuators, levers or the like, which may be electromechanically or hydraulically, or mechanically actuated.

In use, to couple the male and female connector assemblies together, the pull line is pulled up through the tubular member 112, by a pilot line (not shown) which drops through the moon pool 110. As shown by way of example in FIG. 7, when the male and female connector assemblies are close to one another and within the axial, radial and lateral tolerance, they are guided into alignment by the guide arrangements associated with the pin receptors, by further pulling upon the pull line.

When the male and female assemblies 100, 200 are close to being engaged, or loosely engaged, and before the pre-tensioning arrangement 302 has been extended (i.e. when in the first configuration), the coupling portion 160 is pulled sufficiently for the latch pin aperture 164 to be above the jacking plate 320. The latch pin 166 is then inserted through the latch pin aperture 164 and either the jacking plate raised, or more typically the coupling portion slightly lowered, such that the latch pin ends 160a 160b rest in the recesses 324a and 324b.

At this stage the male and female connector assemblies 100, 200, may be loosely engaged. For example, the portions 108, 112 of the pin 110 may be within the pin receptors, but not fully engaged in the recesses 218. Similarly, the collar 206 and intermediate portion 106 may be slightly disengaged, and/or the axes M, F and/or L slightly misaligned. In addition, the pull line 150 may have some slack.

The pre-tensioning arrangement may then be extended to the second configuration, by actuating the hydraulic jacks 330. This at least applies a pre-tensioning force, and in the embodiment shown, pulls the male and female connector assemblies into full cooperative engagement.

As can be seen from FIG. 9, the interior of the latch pin aperture is generally tubular, such that the coupling portion 160 engages with the latch pin over a portion of the length of the latch pin extending therethrough (rather, for example, at a single point, as between links formed between two members of round cross section). In addition, a substantial portion of the exposed ends 166a and 166b of the latch pin 166 are supported by the jacking plate.

The pre-tensioning force (and any additional force applied via the mooring lines in use) is therefore effectively transmitted via these contacting lengths, to the jacking plate and outwardly to the support plate collar 304 from the upper part 310 to the lower part 308, via the plates 314. Similarly, the counter forces are distributed via the comparatively wide diameter coupling portion 160 to the pull line, chain 150, rather than directly and in a more focussed manner, to a chain link.

Optionally, spacers 332 can be inserted between the jacking plate 320 and support plate 316, to passively retain the pre-tensioning arrangement in the second configuration, to obviate the need to maintain hydraulic pressure, or to safeguard against a loss of hydraulic pressure.

Whilst the invention has been described in connection with the foregoing illustrative embodiments, 10 various modifications, additions and alterations may be made to the invention by one skilled in the art without departing from the scope of the claimed invention.

The invention claimed is:

1. A pre-tensionable connector apparatus, comprising:
a first connector assembly;
a second connector assembly for connection to the first connector assembly;
a pre-tensioning arrangement positioned in fixed relation to the second connector assembly, for applying a pre-tensioning force between the first and second connector assemblies, wherein the pre-tensioning arrangement is reconfigurable between a first configuration and a second configuration;
a pull line extending from the first connector assembly and adapted to be coupled to the pre-tensioning arrangement by a coupling apparatus; and
the coupling apparatus for coupling the pull line to the pre-tensioning arrangement such that the pull line extends between and is connected to the first connector assembly and the pre-tensioning arrangement,
wherein, when the first and second connector assemblies are engaged or proximal to one another, a portion of the pull line is positionable in relation to the pre-tensioning arrangement such that the pull line may be coupled thereto by the coupling apparatus,
wherein, when the pre-tensioning arrangement is coupled to the pull line by the coupling apparatus, and the pre-tensioning arrangement is in the second configuration the said pre-tensioning force is applied by the pre-tensioning arrangement between the first and second connector assemblies via the pull line, and
wherein the pre-tensioning arrangement is configured to be locked in place in the second configuration to passively maintain the pre-tensioning force.

2. The pre-tensionable connector apparatus of claim 1, wherein the pre-tensioning force is applied by reconfiguring the pre-tensioning arrangement from the first configuration to the second configuration.

3. The pre-tensionable connector apparatus of claim 1, configured for the coupling apparatus to be connected to the pre-tensioning arrangement when the pre-tensioning arrangement is in the first configuration and wherein, when the pre-tensioning arrangement is coupled to the pull line by the coupling apparatus, reconfiguring the pre-tensioning arrangement from the first configuration to the second configuration applies the said pre-tensioning force.

4. The pre-tensionable connector apparatus of claim 2, wherein the pre-tensioning arrangement is extended in use to reconfigure the pre-tensioning arrangement from the first to the second configuration.

5. The pre-tensionable connector apparatus of claim 4, wherein the pre-tensioning arrangement is extended in use to apply the pre-tensioning force.

6. The pre-tensionable connector apparatus of claim 1, wherein pull line extends to and terminates at a coupling portion.

7. The pre-tensionable connector apparatus of claim 6, wherein the coupling apparatus comprises a latch pin and the coupling portion comprises a generally tubular latch pin aperture extending from a first side to a second side through the coupling portion and sized to receive the latch pin and wherein, in use the pre-tensioning arrangement may engage with the latch pin on the first and second sides of the coupling portion.

8. The pre-tensionable connector apparatus of claim 7, wherein the pre-tensioning arrangement comprises first and second jacking plates, moveable in relation to the second connector assembly to engage with respective ends of the latch pin extending from the latch pin aperture.

9. The pre-tensionable connector apparatus of claim 8, wherein the first and second jacking plates are provided with receiving formations to engage with the ends of the latch pin.

10. The pre-tensionable connector apparatus of claim 1, wherein the connector apparatus further comprises a spacer structure extending between the second connector assembly and the pre-tensioning arrangement.

11. The pre-tensionable connector apparatus of claim 10, wherein the spacer structure is a generally tubular structure or a moon pool through a hull of a floating vessel.

12. The pre-tensionable connector apparatus of claim 11, wherein the pre-tensioning arrangement is attached to, or fixed proximal to, an upper end of the tubular structure or moon pool.

13. The pre-tensionable connector apparatus of claim 1, wherein the pull line is flexible.

14. A moon pool for a floating vessel, the moon pool comprising:
a tubular structure having an upper and a lower end and defining a longitudinal axis; and
connector apparatus according to claim 1.

15. A method of connecting the pre-tensionable connection apparatus according to claim 1, comprising:
bringing the first connector assembly into engagement with the second connector assembly;
reconfiguring the pre-tensioning arrangement from the first configuration to the second configuration;
coupling the pull line to the pre-tensioning arrangement; and
applying a pre-tensioning force between the first and second connector assemblies via the pre-tensioning arrangement, when the pre-tensioning arrangement is in the second configuration.

16. The method of claim 15, comprising coupling the pull line to the pre-tensioning arrangement when the pre-tensioning arrangement is in the first configuration; and reconfiguring the pre-tensioning arrangement from the first configuration to the second configuration to apply the pre-tensioning force.

17. The method of claim 15, comprising:
applying a first force to the pull line between the first and second connector assemblies, wherein the first force is equal to or greater than the pre-tensioning force;
coupling the pre-tensioning arrangement to the pull line;
reconfiguring the pre-tensioning arrangement from the first to the second configuration; and
releasing the first force, whereby the pre-tensioning force such that the pre-tensioning force between the first and second connector assemblies is maintained by the pre-tensioning arrangement, in the second configuration thereof.

18. The method of claim 15, comprising pulling the pull line to bring the first and second coupling assemblies into engagement with or into proximity to one another.

19. The method of claim 18, comprising pulling the pull line via a moon pool on a floating vessel.

20. A pre-tensionable connector apparatus, comprising:
a first connector assembly;
a second connector assembly for connection to the first connector assembly;
a pre-tensioning arrangement positioned in fixed relation to the second connector assembly, for applying a pre-tensioning force between the first and second connector assemblies, wherein the pre-tensioning arrangement is reconfigurable between a first configuration and a second configuration;
a pull line extending from the first connector assembly and adapted to be coupled to the pre-tensioning arrangement by a coupling apparatus; and
the coupling apparatus for coupling the pull line to the pre-tensioning arrangement,
wherein, when the first and second connector assemblies are engaged or proximal to one another, a portion of the pull line is positionable in relation to the pre-tensioning arrangement such that the pull line may be coupled thereto by the coupling apparatus,
wherein, when the pre-tensioning arrangement is coupled to the pull line by the coupling apparatus, and the pre-tensioning arrangement is in the second configuration the said pre-tensioning force is applied by the pre-tensioning arrangement between the first and second connector assemblies via the pull line,
wherein pull line extends to and terminates at a coupling portion, and
wherein the coupling apparatus comprises a latch pin and the coupling portion comprises a generally tubular latch pin aperture extending from a first side to a second side through the coupling portion and sized to receive the latch pin and wherein, in use the pre-tensioning arrangement may engage with the latch pin on the first and second sides of the coupling portion.

* * * * *